(12) United States Patent
Plati et al.

(10) Patent No.: US 9,964,012 B2
(45) Date of Patent: May 8, 2018

(54) METHOD FOR SIZING AND POSITIONING CATALYTIC CONVERTER INSULATION

(71) Applicant: Vida Holdings Corp. Ltd., Woodbridge, Ontario (CA)

(72) Inventors: Stefano Plati, Woodbridge (CA); Gregory Kiyoshi Koyanagi, North York (CA); Voislav Blagojevic, North York (CA)

(73) Assignee: Vida Fresh Air Corp., Woodbridge, Ontario (CA)

( * ) Notice: Subject to any disclaimer, the term of this patent is extended or adjusted under 35 U.S.C. 154(b) by 0 days. days.

(21) Appl. No.: 14/347,810

(22) PCT Filed: Jan. 17, 2014

(86) PCT No.: PCT/CA2014/000032
§ 371 (c)(1),
(2) Date: Mar. 27, 2014

(87) PCT Pub. No.: WO2015/106332
PCT Pub. Date: Jul. 23, 2015

(65) Prior Publication Data
US 2015/0285115 A1    Oct. 8, 2015

(51) Int. Cl.
*F01N 3/18* (2006.01)
*F01N 3/28* (2006.01)
(Continued)

(52) U.S. Cl.
CPC ........... *F01N 3/18* (2013.01); *B01D 53/9495* (2013.01); *F01N 3/2828* (2013.01);
(Continued)

(58) Field of Classification Search
CPC ............ B01D 46/2418; B01D 46/2451; B01D 46/2455; B01D 46/2462; F02D 9/04; F01N 2240/20; F01N 13/02; F01N 13/10
(Continued)

(56) References Cited

U.S. PATENT DOCUMENTS 3,853,485 A * 12/1974 Hogan ................... B01D 53/86
422/180
7,238,217 B2 * 7/2007 Cutler ................ B01D 46/2429
55/385.3

(Continued)

FOREIGN PATENT DOCUMENTS

DE        10331691        4/2006
DE      102005012066      9/2006
(Continued)

OTHER PUBLICATIONS

PCT Patent Application No. PCT/CA2014/000032; International Search Report and Written Opinion, dated Jul. 22, 2014.

*Primary Examiner* — Mark Laurenzi
*Assistant Examiner* — Patrick Maines
(74) *Attorney, Agent, or Firm* — Head, Johnson, Kachigian & Wilkinson, PC

(57) ABSTRACT

The substrate is used in a catalytic converter can to which a cylindrical inlet pipe leads and has an inner catalytic zone portion, an outer catalytic zone portion and an insulation material thermally separating the portions. The insulation extends through the substrate and has a uniform cross-section substantially defined by the intersection of two notional cylinders and the upstream face of the substrate, each notional cylinder having: a nominal diameter that is between 1.08 and 1.20 of the diameter of the inlet pipe; a thickness of 1-4 mm; and an axis aligned with the gas direction at the point of maximum velocity at the intersection of the inlet pipe and the can. One of the cylinders is
(Continued)

associated with the gas flow at the lower limit of the operating range and the other of the cylinders is associated with the gas flow at the upper limit of the operating range.

1 Claim, 11 Drawing Sheets

(51) Int. Cl.
*F01N 13/14* (2010.01)
*F01N 13/00* (2010.01)
*B01D 53/94* (2006.01)

(52) U.S. Cl.
CPC ....... *F01N 3/2892* (2013.01); *F01N 13/0097* (2014.06); *F01N 13/14* (2013.01); *F01N 2240/20* (2013.01); *F01N 2260/08* (2013.01)

(58) Field of Classification Search
USPC ............ 60/274, 273, 299, 324, 322; 55/523; 422/177; 53/885, 88, 92
See application file for complete search history.

(56) References Cited

U.S. PATENT DOCUMENTS

| 2002/0073811 | A1* | 6/2002 | Hughes | B01D 53/885 82/1.11 |
| 2002/0086614 | A1* | 7/2002 | Eichelberger | B01D 53/885 451/8 |
| 2003/0097834 | A1 | 5/2003 | Gabe et al. | |
| 2004/0076794 | A1 | 4/2004 | Hijikata | |
| 2004/0211164 | A1 | 10/2004 | Hamanaka et al. | |
| 2005/0214178 | A1* | 9/2005 | LaBarge | B01D 53/9454 422/180 |
| 2010/0050598 | A1* | 3/2010 | Plati | B01D 53/9454 60/274 |
| 2013/0045148 | A1* | 2/2013 | Chivilikhin | B01D 53/9454 423/212 |
| 2013/0121887 | A1* | 5/2013 | Pimpalgaonkar | F01N 3/2892 422/176 |
| 2013/0336862 | A1* | 12/2013 | Yacoub | B01D 53/9495 423/212 |
| 2014/0004014 | A1* | 1/2014 | Hashimoto | F01N 3/2842 422/174 |
| 2014/0290218 | A1* | 10/2014 | Plati | F01N 3/2828 60/274 |

FOREIGN PATENT DOCUMENTS

| EP | 0965736 | 12/1999 |
| EP | 1312776 | 5/2003 |
| EP | 1382374 | 1/2004 |
| EP | 1413345 | 4/2004 |
| EP | 1486242 | 12/2004 |
| JP | 5-61418 | 8/1993 |
| JP | 07-251079 | 10/1995 |
| JP | 2002292225 | 10/2002 |
| JP | 2003161136 | 6/2003 |
| JP | 2009183832 | 8/2009 |
| WO | WO2010022507 A1 | 3/2010 |

* cited by examiner

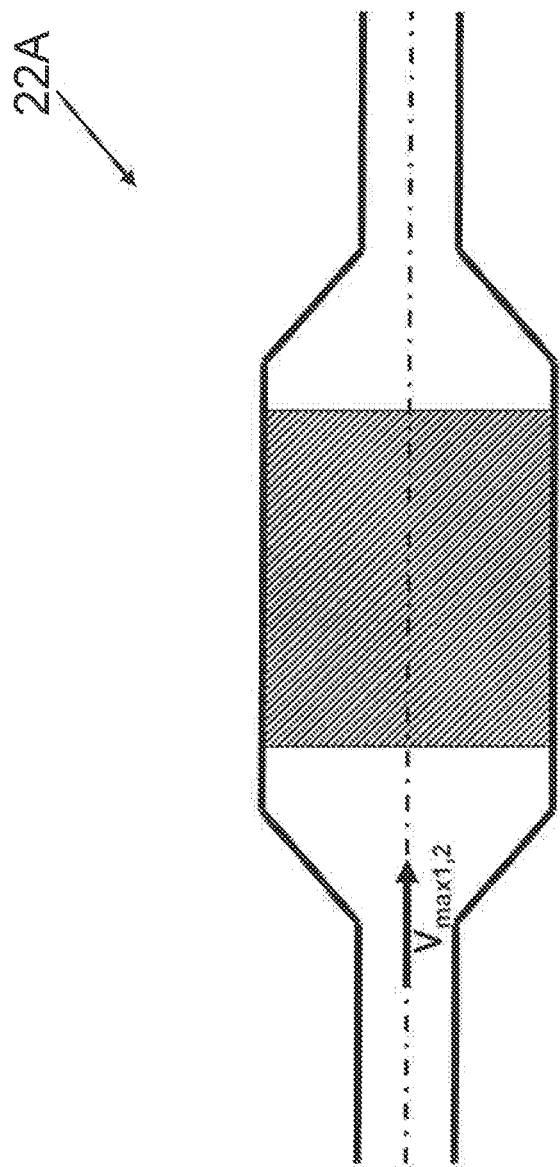
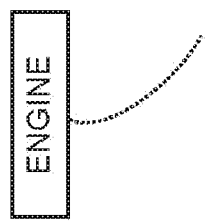
Fig. 4

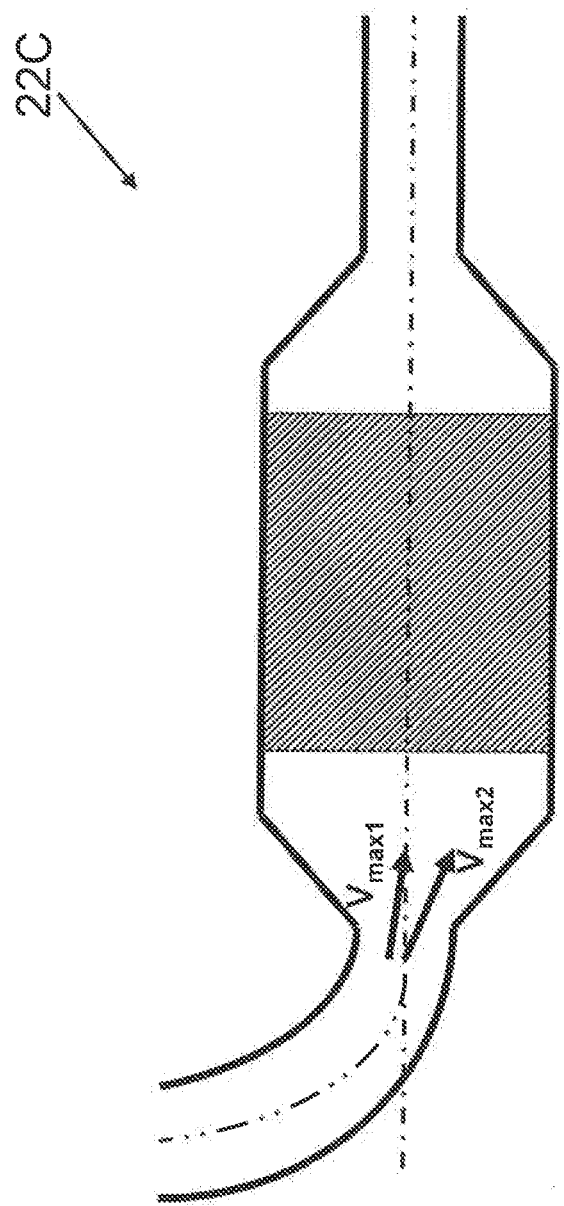
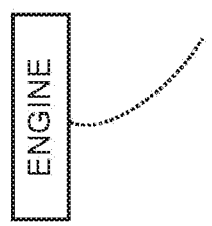
Fig. 6

METHOD FOR SIZING AND POSITIONING CATALYTIC CONVERTER INSULATION

FIELD OF THE INVENTION

The invention relates to the field of exhaust gas treatment.

BACKGROUND OF THE INVENTION

It is known to reduce backpressure by the interposition of a layer of insulation in the substrate of a catalytic converter; using the teachings of PCT/CA2013/000663, incorporated herein by reference, for any given application, suitable insulation can be designed through routine experimentation by persons of ordinary skill in the art.

SUMMARY OF THE INVENTION

Forming one aspect of the invention is a method for expediting the design of an insulation layer in a catalytic converter substrate for a combustion engine that has a operating power range having upper and lower limits, the substrate being of the type which, in use, substantially fully occupies, but for the diffuser cones, a catalytic converter can to which a cylindrical inlet pipe leads. The method comprises the steps:

i. determining the gas direction at the point of maximum gas velocity at the intersection of the inlet pipe and the can, when the engine is operating at the lower limit of the operating power range;

ii. determining the gas direction at the point of maximum gas velocity at the intersection of the inlet pipe and the can, when the engine is operating at the upper limit of the operating power range; and iii. defining a benchmark catalytic converter substrate.

In the benchmark:
an outer catalytic zone portion of the substrate surrounds an inner catalytic zone portion of the substrate;
an insulation material thermally separates the inner and outer zones;
an insulation material extends through the substrate and has a uniform cross-section throughout the length of the substrate;
the uniform cross-section is substantially defined by the intersection of two notional cylinders and the upstream face of the substrate;
each notional cylinder has: a nominal inner diameter that is between 1.08 and 1.20 of the diameter of the inlet pipe; a thickness of 0.8-4 mm; and an axis aligned with the gas direction at the point of maximum velocity at the intersection of the inlet pipe and the can
one of the notional cylinders is associated with the gas flow at the lower limit of the operating power range and the other of the notional cylinders is associated with the gas flow at the upper limit of the operating power range.

Forming another aspect of the invention is an improved catalytic converter substrate, the substrate being of the type used with a combustion engine that has a operating power range having upper and lower limits; and further being of the type used in a catalytic converter can to which a cylindrical inlet pipe leads.

The improvement comprises: an inner catalytic zone portion of the substrate; an outer catalytic zone portion of the substrate, surrounding the inner catalytic zone; and an insulation material thermally separating the zones.

The insulation material extends through the substrate and has a uniform cross-section throughout the length of the substrate. The uniform cross-section is substantially defined by the intersection of two notional cylinders and the upstream face of the substrate, each notional cylinder having: a nominal inner diameter that is between 1.08 and 1.20 of the diameter of the inlet pipe; a thickness of 0.8-4 mm; and an axis aligned with the gas direction at the point of maximum velocity at the intersection of the inlet pipe and the can. One of the notional cylinders is associated with the gas flow at the lower limit of the operating power range and the other of the notional cylinders is associated with the gas flow at the upper limit of the operating power range.

Advantages, features and characteristics of the present invention will become apparent to persons of ordinary skill in the art upon review of the following detailed description and the appended drawings, the latter being briefly described hereinafter.

BRIEF DESCRIPTION OF THE DRAWINGS

FIG. 4 is a view similar to FIG. 1 showing the points of maximum gas velocity at the intersection of the inlet pipe and the can at the lower limit of an operating power range and the upper limit of an operating power range

FIG. 6 is a view similar to FIG. 3 showing the points of maximum gas velocity at the intersection of the inlet pipe and the can at the lower limit of the operating power range and the upper limit of the operating power range;

FIG. 7A is a view along section 7A-7A of FIG. 1;

FIG. 8A is a view along section 8A-8A of FIG. 7;

DETAILED DESCRIPTION OF AN EXEMPLARY METHOD

Figure 1:
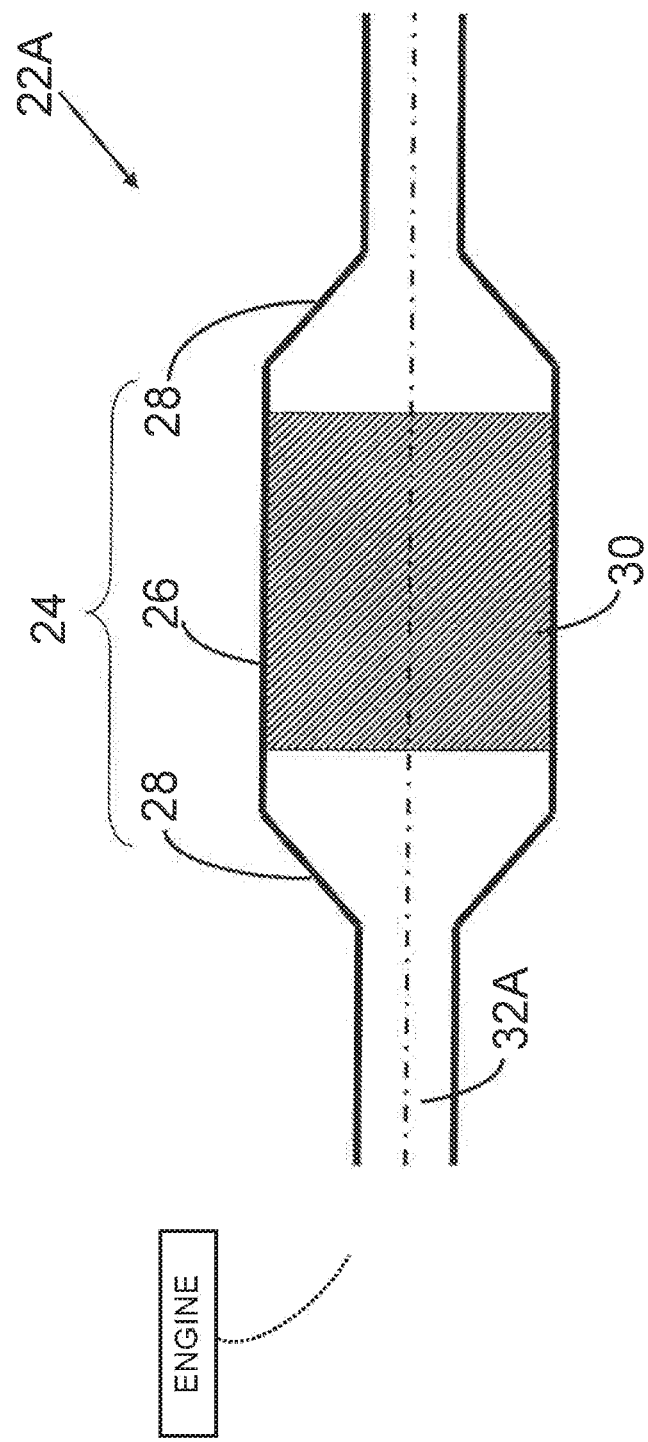
FIG. 1 shows a schematic axially symmetric catalytic converter
Figure 2:
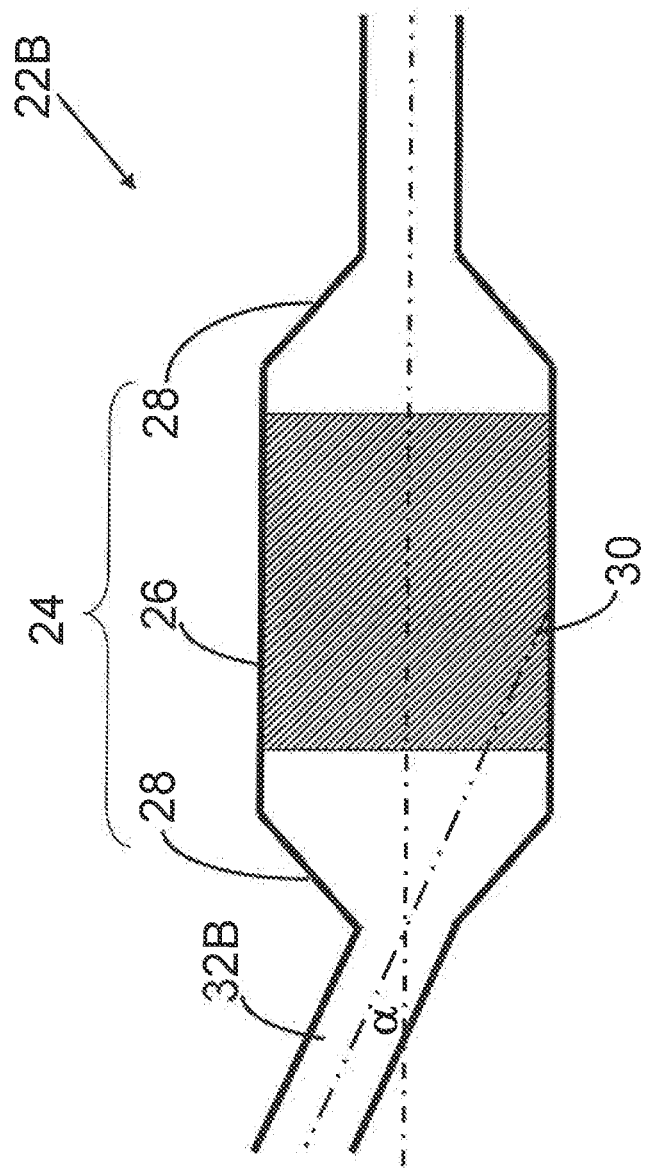
FIG. 2 shows a schematic catalytic converter with angled inlet
Figure 3:
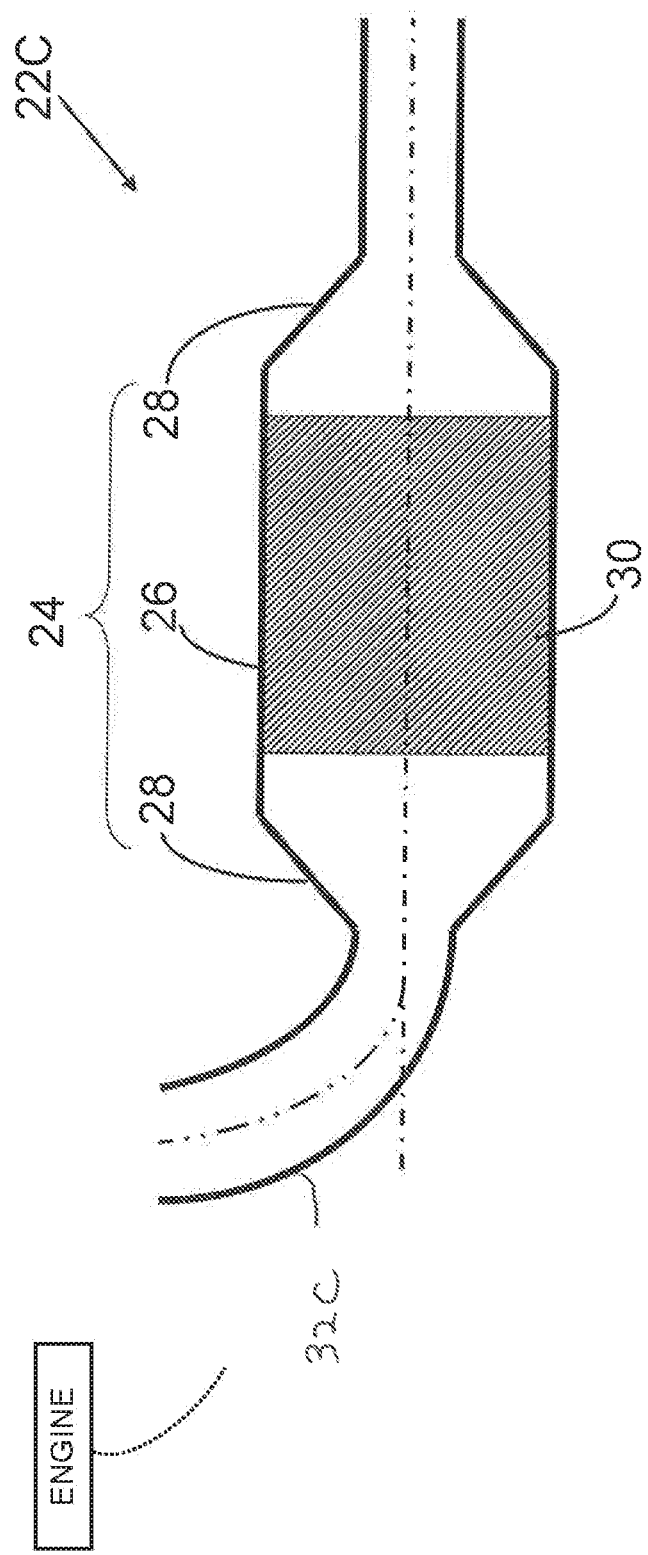
FIG. 3 shows a schematic catalytic converter with curved inlet

Reference is now made to FIGS. 1-3 which show exemplary catalytic converter systems with which the invention can be usefully deployed:

FIG. 1 shows a schematic axially symmetric catalytic converter system 22A

FIG. 2 shows a schematic catalytic converter system 22B with angled inlet

FIG. 3 shows a schematic catalytic converter system 22C with curved inlet

Each system 22A, 22B and 22C includes a can 24 having a cylindrical housing 26 and a pair of diffuser cones 28 and a honeycomb ceramic substrate 30 substantially fully occupying the can 24. The can 24 in system 22A is fed by a cylindrical inlet pipe 32A aligned with the axis of the can 24; in system 22B, the inlet pipe 32B is cylindrical but disposed at angle α to the axis of the can; and in system 22C, the inlet pipe 32C is curved.

Initial steps in the method involve, in respect of any given engine with which the converter is to be used, the determination of the gas direction at the point of maximum gas velocity
  when the engine is at the lower limit of the operating power range of concern; and
  when the engine is at the upper limit of the operating power range of concern.

The operating range varies from application to application and in some cases, the range may be defined by a single value. For example, stationary engines, such as generators, are often used at a single power setting, typically 60-80% of designed power, while large freight trucks are operated at a highway cruising power level (20-30% of maximum) for most of their operating time. In the case of common passenger vehicles, the operating range used may be that defined by the typical operating power range, i.e. something between 30 and 80 percent of the maximum power of the engine. The determination of gas direction can be done through measurement, but will normally be done through Computational Fluid Dynamics (CFD) modelling, as the interposition of measurement devices can themselves create flow disruption In the context of the catalytic converter shown in FIG. 3, there exists a substantial difference between the points of maximum gas velocity $V_{max\ 1}$, $V_{max\ 2}$: at lower gas velocities the centrifugal force that the gas molecules are exposed to in the curved pipe is lower and the maximum of the exhaust gas distribution $V_{max\ 1}$ is closer to the center of the pipe; at higher gas velocities the centrifugal force is stronger and the maximum of the exhaust gas distribution $V_{max\ 2}$ is closer to the pipe wall, all as shown in FIG. 6.

CFD simulations show, that, for a curved inlet pipe 58 mm in diameter, the difference between the low and high flow positions is 11 mm.

Figure 5:
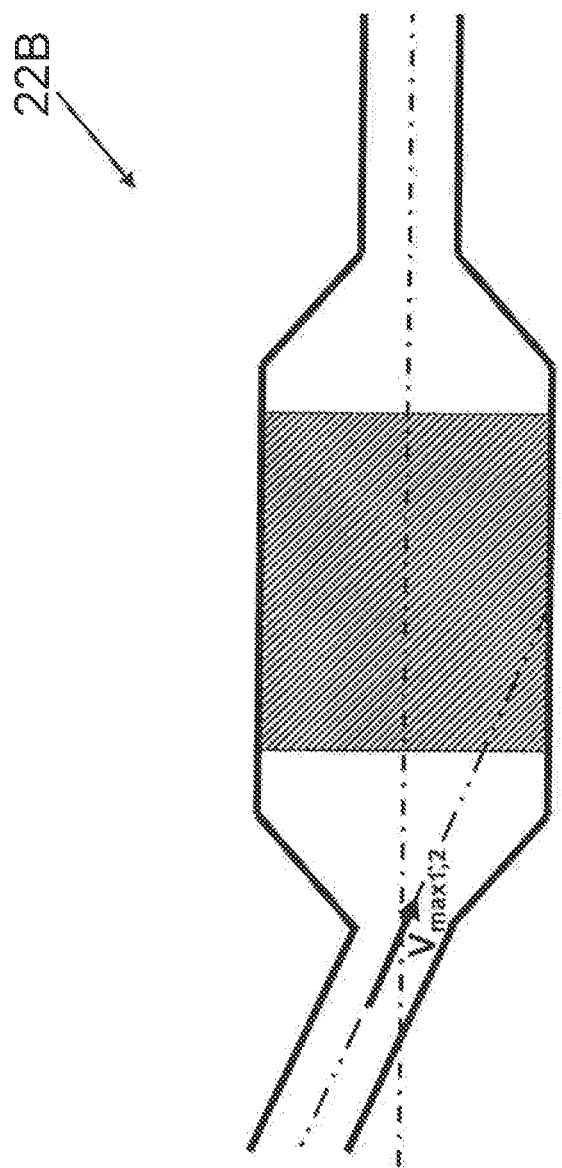
FIG. 5 is a view similar to FIG. 2 showing the points of maximum gas velocity at the intersection of the inlet pipe and the can at the lower limit of the operating power range and the upper limit of the operating power range.

Similar simulations can be done for the catalytic converters of FIGS. 2 and 3, as in some exceptional circumstances, some divergence may occur, but nominally, the point of maximum gas velocity, and both high and low flow conditions, is simply aligned with the centreline of the inlet pipe in both cases, as shown in FIGS. 4 and 5, wherein $V_{max\ 1}$ and $V_{max\ 1}$ are defined by the same vector.

Figure 7:
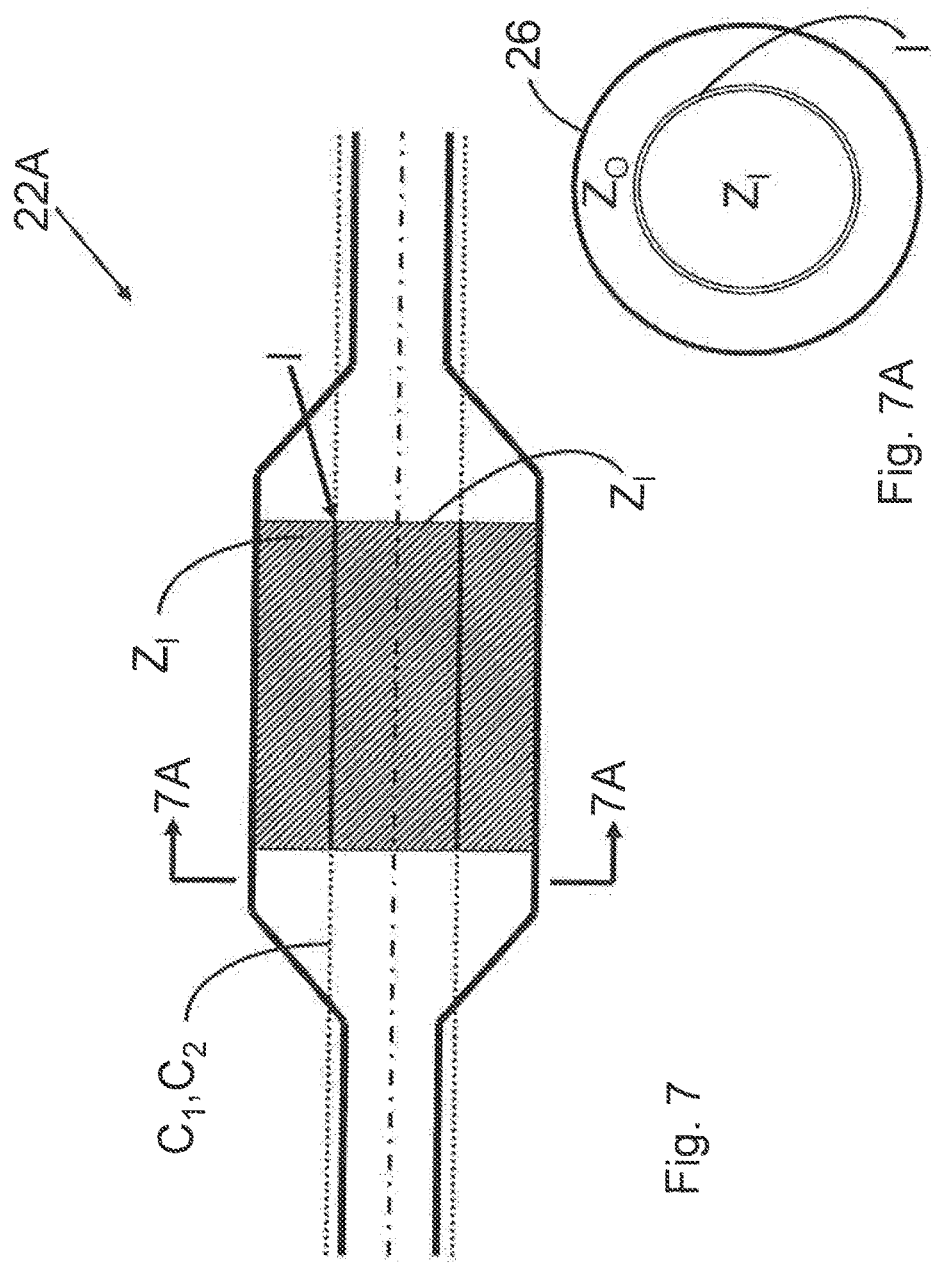
FIG. 7 shows a schematic catalytic converter similar to FIG. 1.
Figure 8:
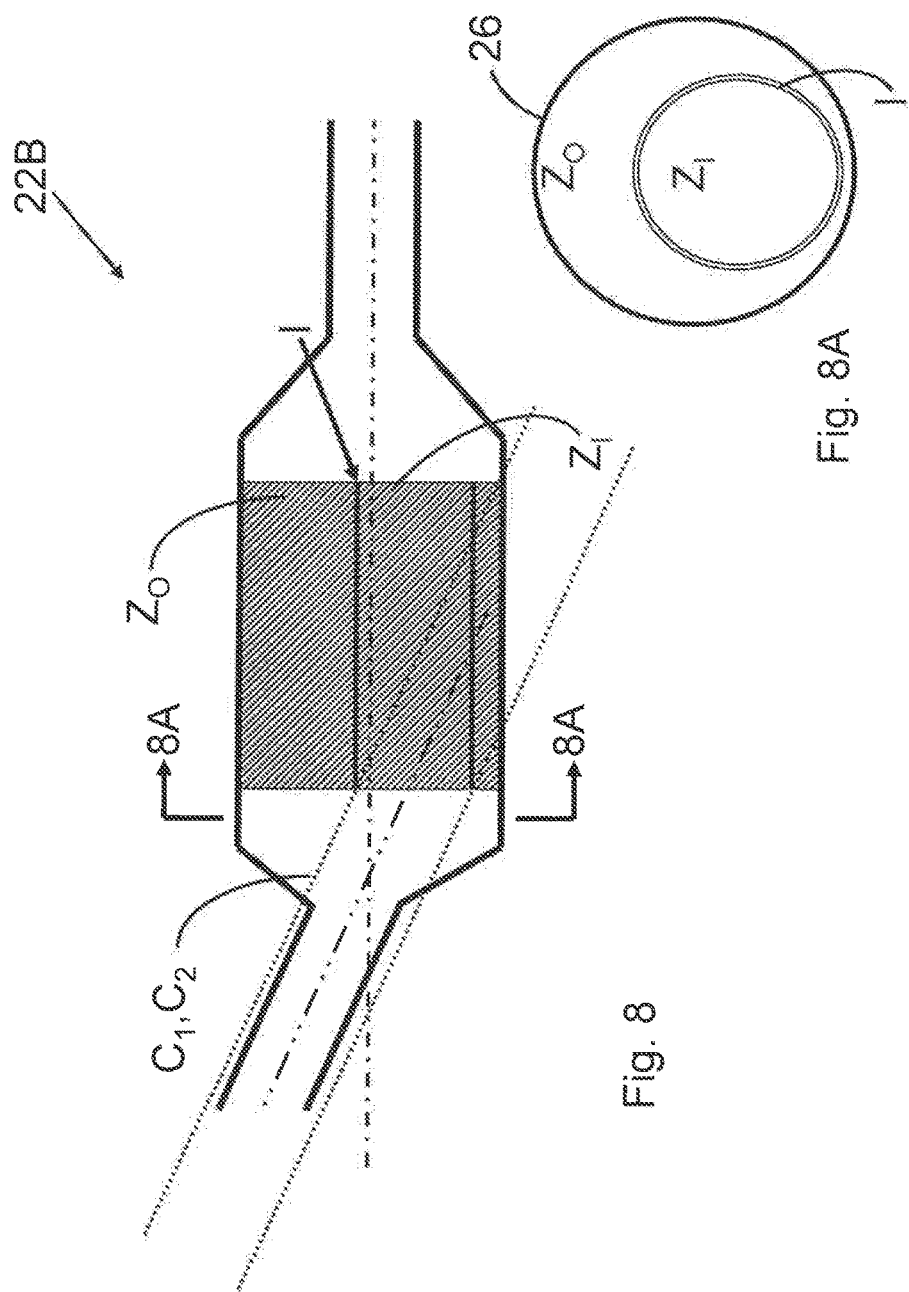
FIG. 8 shows a schematic catalytic converter similar to FIG. 1.

With this information in hand, a benchmark is designed. In the benchmark:
  an outer tubular outer catalytic zone portion of the substrate surrounds an inner catalytic zone portion of the substrate;
  an insulation material thermally separates the inner catalytic zone and the outer outer catalytic zone;
  an insulation material extends through the substrate and has a uniform cross-section throughout the length of the substrate;
  the uniform cross-section is substantially defined by the intersection of two notional cylinders and the upstream face of the substrate;
  each notional cylinder has: a nominal inner diameter that is between 1.08 and 1.20 of the diameter of the inlet pipe; a thickness of 0.8-4 mm; and an axis aligned with the gas direction at the point of maximum velocity at the intersection of the inlet pipe and the can; and
  one $C_1$ of the notional cylinders is associated with the gas flow at the lower limit of the operating power range and the other $C_2$ of the notional cylinders is associated with the gas flow at the upper limit of the operating power range The benchmarks for the exemplary systems of FIGS. 4-6 are shown in FIGS. 7-9; in each benchmark, the outer zone is indicated by $Z_o$, the inner zone is indicated by $Z_I$ and the insulation layer is indicated by I.

Figures 9, 9A:
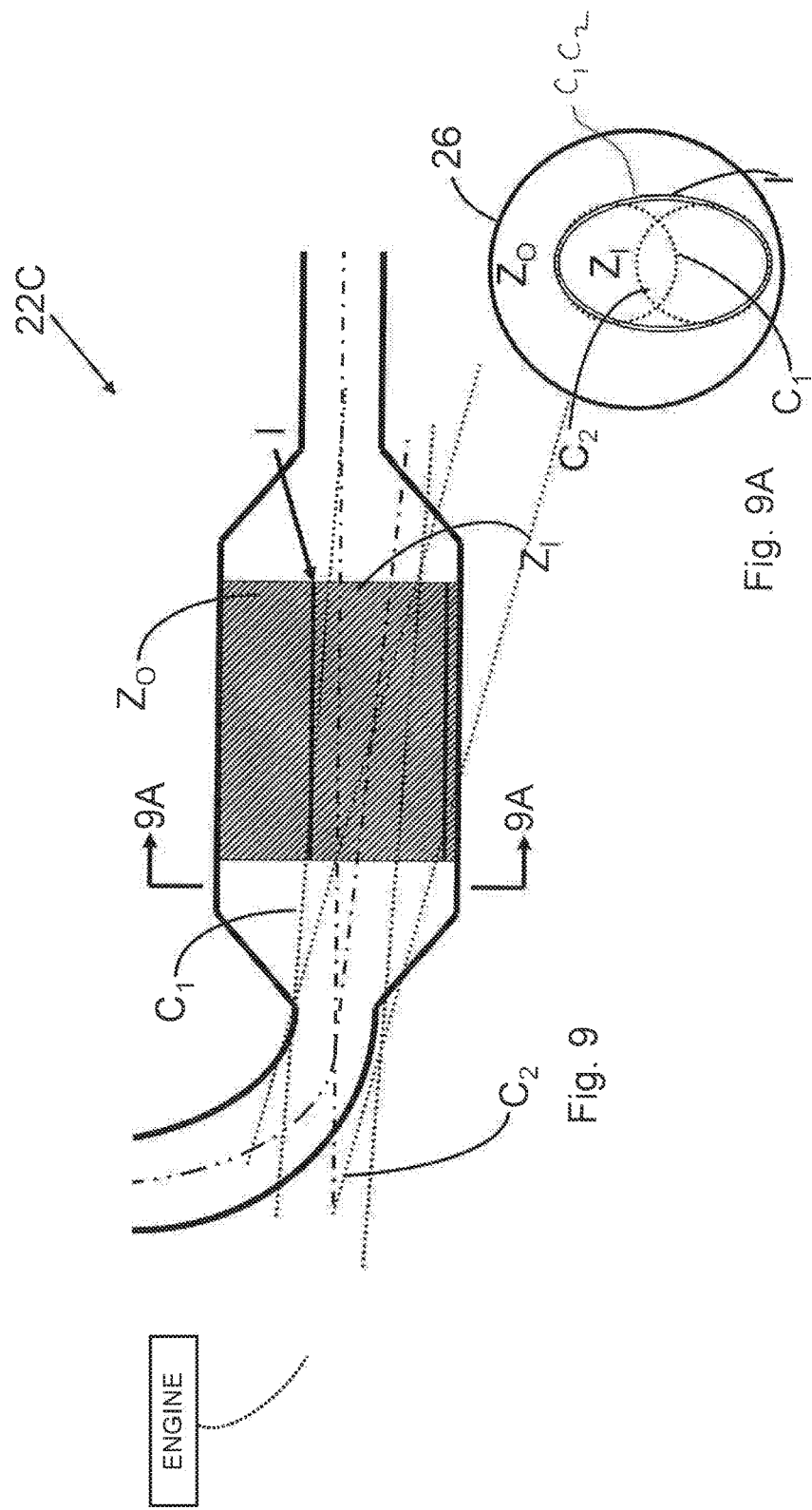
FIG. 9 shows a schematic catalytic converter similar to FIG. 1.
FIG. 9A is a view along section 9A-9A of FIG. 9.

It will be evident that, in the converter of FIG. 1, the notional cylinders $C_1$ and $C_2$ will be coincident and define a cylinder of insulation, as indicated in FIG. 7A; in the converter of FIG. 2, the notional cylinders $C_1$ and $C_2$ will be coincident and will define an ellipse, as indicated in FIG. 8A; and in the converter of FIG. 6, the notional cylinders will be overlapping but not coincident and the insulation is defined by an ovaloid $C_1 C_2$ that overlaps both projections, as indicated in FIG. 9A.

Figures 10, 10A:
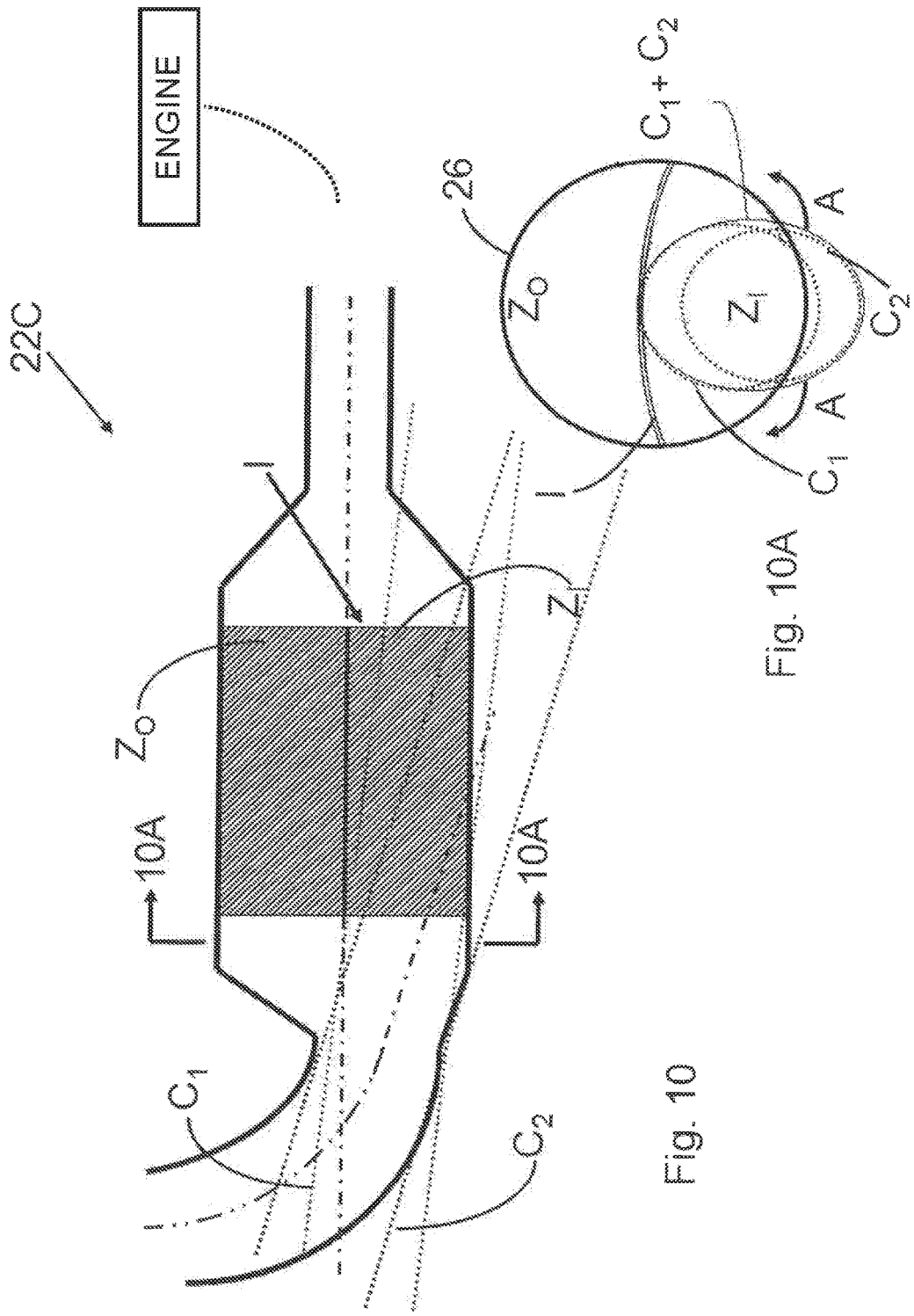
FIG. 10 shows a schematic catalytic converter similar to FIG. 3.
FIG. 10A is a view along section 10A-10A of FIG. 10.

A variation to FIG. 9 is shown in FIG. 10, wherein the inlet pipe is curved and enters adjacent the sidewall of the housing. The location causes a portion of the ovaloid $C_{1+}C_2$ defined by notional cylinders $C_1$ and $C_2$ to project outside the cylindrical housing 26, such that only an arc lies within the housing 26. To accommodate this notional loss of flow area, the endpoints of the arc are drawn apart from one another, as indicated by arrows A in FIG. 10, until such time as the area encompassed between the arc and the can sidewall is equivalent to the area of the original ovaloid. The same adjustment applies for converters of the type shown in FIG. 8, if the projection lies outside the can.

Without intending to be bound by theory, it is believed that the benchmark will expedite the design of insulated catalytic converter substrates, as this reduce the routine experimentation otherwise required of persons of ordinary skill in the art.

Figure 11:
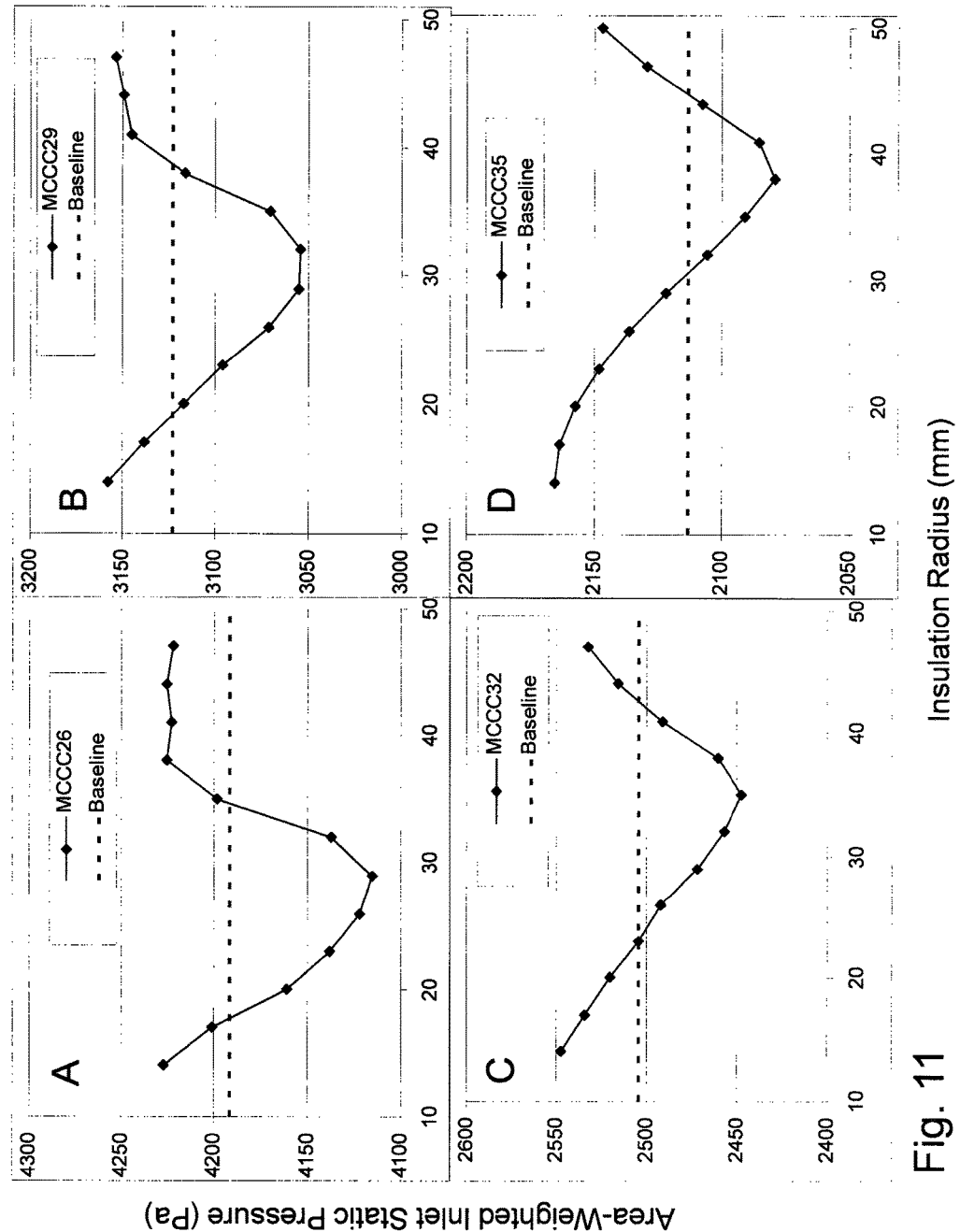
FIGS. 11A-D show inlet back pressure as a function of insulation position for a variety of catalytic converters of the type shown in FIG. 7.

Experimentation has been carried out which supports this conclusion. By way of example, FIGS. 11A-11D show inlet back pressure as a function of insulation position for a variety of catalytic converters of the type shown in FIG. 7. FIG. 11A shows results for a 26 mm radius inlet pipe. FIG. 11B shows results for a 29 mm radius inlet pipe. FIG. 11C shows results for a 32 mm radius inlet pipe. FIG. 11D shows results a 35 mm radius inlet pipe. All other simulation parameters were equal, including exhaust gas temperature and flow rate through the catalytic converter.

Optimum insulation position was defined as that producing the minimum area averaged back pressure in the inlet pipe approx. 30 cm from the catalytic converter can. In each case, the optimum insulation diameter fell within the range of 1.08 and 1.20 of the inlet pipe diameter.

Whereas but a specific embodiment of a method is described, and various specific embodiments of catalytic converter substrates are described, it will be evident that variations are possible.

For example, whereas the examples contemplate usefulness with cylindrical inlet pipes, the methodology would be useful for pipes that departed slightly from the perfectly cylindrical.

Additionally, whereas the terms "inner" and "outer" are used in the specification and claims, it should be understood that in the variation contemplated by FIG. 10, the "outer" zone is that portion indicated as lying above insulation I and the "inner" zone is that portion indicated as lying below insulation I; "inner" and "outer" are references to proximity to the inlet pipe axis.

Accordingly, the invention should be understood as limited only by the accompanying claims, purposively construed.

The invention claimed is:

1. An improved catalytic converter substrate, the substrate being of the type used with a combustion engine that has an operating range having upper and lower limits; and further being of the type used in a catalytic converter can to which a cylindrical inlet pipe leads, wherein the improvement comprises:
   an inner catalytic zone portion of the substrate;
   an outer catalytic zone portion of the substrate, surrounding the inner catalytic zone portion;
   an insulation material thermally separating the inner and outer zone portions,
wherein
   the insulation material extends through the substrate and has a uniform cross-section throughout a length of the substrate;
   the uniform cross-section is substantially defined by the intersection of two notional cylinders and an upstream face of the substrate, each notional cylinder having: a nominal diameter that is between 1.08 and 1.20 of a diameter of an inlet pipe; a cylinder wall thickness of 1-4 mm; and an axis aligned with the gas direction at the point of maximum velocity at the intersection of the inlet pipe and the can; and
   one of the cylinders is associated with the gas flow at the lower limit of the operating range and the other of the cylinders is associated with the gas flow at the upper limit of the operating range.

* * * * *